(12) United States Patent
Poltorak et al.

(10) Patent No.: US 8,057,883 B2
(45) Date of Patent: Nov. 15, 2011

(54) ABRASIVE PROCESS FOR MODIFYING CORNERS, EDGES, AND SURFACES OF CAPACITOR ANODE BODIES

(75) Inventors: Jeffrey Poltorak, Fountain Inn, SC (US); Christian Guerrero, Travelers Rest, SC (US); Yongjian Qui, Greenville, SC (US); Lance Thornton, Simpsonville, SC (US)

(73) Assignee: Kemet Electronics Corporation, Greenville, SC (US)

( * ) Notice: Subject to any disclaimer, the term of this patent is extended or adjusted under 35 U.S.C. 154(b) by 340 days.

(21) Appl. No.: 11/936,265

(22) Filed: Nov. 7, 2007

(65) Prior Publication Data

US 2008/0299335 A1 Dec. 4, 2008

Related U.S. Application Data

(63) Continuation-in-part of application No. 11/807,765, filed on May 30, 2007, now Pat. No. 7,658,986.

(51) Int. Cl.
*B32B 3/26* (2006.01)
*H01G 9/04* (2006.01)

(52) U.S. Cl. ............... 428/192; 428/220; 428/304.4; 428/319.1; 428/319.3; 428/457; 428/689; 361/528

(58) Field of Classification Search ............... None
See application file for complete search history.

(56) References Cited

U.S. PATENT DOCUMENTS

| | | | |
|---|---|---|---|
| 3,483,438 A | 12/1969 | Sharbaugh | |
| 5,119,274 A * | 6/1992 | Kinuta et al. | 361/525 |
| 5,688,606 A | 11/1997 | Mahulikar et al. | |
| 5,949,639 A | 9/1999 | Maeda et al. | |
| 5,959,831 A | 9/1999 | Maeda et al. | |
| 6,072,694 A | 6/2000 | Hahn et al. | |
| 6,191,936 B1 | 2/2001 | Webber et al. | |
| 6,391,379 B1 | 5/2002 | Lessner et al. | |
| 6,451,074 B2 | 9/2002 | Bluvstein et al. | |
| 6,939,500 B2 | 9/2005 | Bernard | |
| 7,116,548 B2 | 10/2006 | Satterfield, Jr. et al. | |
| 7,154,742 B1 | 12/2006 | Hahn et al. | |
| 7,190,572 B2 | 3/2007 | Maeda | |
| 2002/0088507 A1 * | 7/2002 | Rao et al. | 148/422 |
| 2004/0251140 A1 * | 12/2004 | Chung | 205/50 |
| 2005/0231895 A1 | 10/2005 | Maeda | |
| 2006/0233653 A1 | 10/2006 | Trapalis | |
| 2007/0030622 A1 * | 2/2007 | Saida et al. | 361/272 |
| 2007/0253147 A1 * | 11/2007 | Marek et al. | 361/528 |

OTHER PUBLICATIONS

Improving Thermal Shock Resistance of Surface Mount Tantalum Capacitors, D.M. Fortin, J.B. Edson, Mar. 23, 1994, R & M Library Citation.

* cited by examiner

*Primary Examiner* — Ling Xu
(74) *Attorney, Agent, or Firm* — Joseph T. Guy; Nexsen Pruet, LLC

(57) ABSTRACT

Porous sintered bodies for capacitors formed from valve metals are treated by electrolysis to form a dielectric layer and coated with cathode layers. When standard parallelepiped shapes are used as they were passed, cathode coverage at the sharp corners and edges is non-uniform and failures occur at those locations. Treating pressed anode bodies with an abrasive process alters the sharpness of corners and edges, creating rounded transitions between primary surfaces and remove surface imperfections resultant from the pressing process both of which enhance cathode layer uniformity.

19 Claims, 11 Drawing Sheets

ABRASIVE PROCESS FOR MODIFYING CORNERS, EDGES, AND SURFACES OF CAPACITOR ANODE BODIES

CROSS REFERENCE TO RELATED APPLICATIONS

This application is a continuation-in-part of U.S. patent Ser. No. 11/807,765 filed May 30, 2007 now U.S. Pat. No. 7,658,986.

FIELD OF THE INVENTION

This invention relates to a process for optimizing the geometries of anode bodies used in solid electrolytic capacitors. More particularly, the invention relates to a process to modify the geometries of capacitor anodes to reduce sharp angles where primary surfaces meet.

BACKGROUND OF THE INVENTION

The anode of a typical solid electrolytic capacitor consists of a porous anode body with a lead wire extending beyond the anode body and connected to the positive mounting termination of the capacitor. The anode is formed by first pressing a valve metal powder into a pellet. Alternatively, the anode may be an etched foil, for example aluminum foil as is commonly used in the industry. The anode is a conductive material, more preferably a metal or conductive metal oxide or conductive metal nitride. A particularly preferred anode material is a valve metal, conductive oxide of a valve metal or a conductive nitride of a valve metal with the preferred valve metals including Al, Ta, Nb, Ti, Zr, Hf, W, and mixtures thereof. Al, Ta, Nb and NbO are particularly preferred anode materials. The pressed anode is sintered to form fused connections between the individual powder particles. All anodes are anodized to a pre-determined voltage in a liquid electrolyte to form an oxide of the valve metal which serves as the dielectric of a solid electrolytic capacitor. A primary cathode material, such as a conductive polymer or manganese dioxide, is subsequently applied. Application of primary cathode material is commonly via a liquid dipping process, but other methods such as spraying, brushing, rolling, etc. can also be employed. In order to minimize the equivalent series resistance (ESR) of solid electrolytic capacitors a highly conductive coating, usually silver paint, is applied to the surfaces of the device. Similar to the primary cathode material application methods include dipping, spraying, brushing, etc. A carbon layer, usually applied between the primary cathode material and terminal silver layer, serves as a chemical barrier to isolate the two layers. The silvered anodes are then assembled onto a carrier material that commonly provides the end terminations, and the assembly is encapsulated to form the finished devices. The encapsulation process may be a transfer molding process, or conformal coating process, to manufacture surface mount capacitors. Conformal coating with a plastic sealant is often used to manufacture leaded devices. The industry standard end product shape for surface mount capacitors are rectangular parallelepiped, or cuboid, thus the anodes used in these devices are similarly shaped to maximize volumetric efficiency of the device.

In hermetically sealed capacitors the silvered anodes are placed in cylindrical cans containing a solder plug. Heat is applied to the can to reflow the solder. After reflow the solder secures the anode in place and forms an electrical connection between the cathode and the metallic can. The anodes used in these devices are cylindrical.

The reliability of all such devices is highly dependent on the quality of the external cathode layers.

Dielectric formation is never perfect, and results in leakage sites between the anode and cathode materials. The ability to isolate flaws in the dielectric is a requirement of the primary cathode material chosen for manufacturing solid electrolytic capacitors. This property of the primary cathode material results in a process termed 'healing'. The application of voltage to the capacitor causes current to flow through flaw sites in the dielectric, resulting in an increase in the temperature at the defect site due to Joule heating. The temperature of the cathode layer immediately adjacent to the flaw site increases due to conduction. As current flows through the flaw site, the counter electrode material immediately adjacent to the flaw site is rendered nonconductive. When manganese dioxide is employed as the cathode material, the manganese dioxide immediately adjacent to the flaw site is converted to manganese sesquioxide at the decomposition temperature of manganese dioxide (500-600° C.), thus isolating the flaw. Since the resistivity of manganese sesquioxide is several orders of magnitude greater than that of manganese dioxide, leakage currents through the flaw sites decrease according to Ohm's law. A similar mechanism is postulated for conductive polymer counter electrodes. Possible mechanisms to account for the healing mechanism of conductive polymer films include complete decomposition of the polymer adjacent to the flaw site, over oxidation of the polymer, and dedoping of the polymer at the flaw site. At temperatures above 600° C. the amorphous tantalum pentoxide which serves as the dielectric in tantalum capacitors is converted to a conductive crystalline state. Thus, in order to be an effective primary cathode material for tantalum the material must convert to a nonconductive state at temperatures below 600° C. The maximum withstanding temperatures of other valve metal oxides is similar to that of tantalum.

Since the graphite and silver layers do not decompose to form nonconductive materials at temperatures below 600° C., continuous coating of all dielectric surfaces by the primary cathode material is essential to prevent the graphite or silver layers from contacting the dielectric. If the graphite or silver do contact the dielectric there will be a short circuit of the device.

Conductive polymer coatings are applied to the anode using a variety of methods as described in U.S. Pat. No. 6,072,694. The use of polymer slurries or liquid suspensions containing pre-polymerized conductive polymer as an alternative to the monomer is very attractive due to the simplicity of manufacturing, the reduction in waste, and the elimination of costly and time consuming washing steps after each coating step as directed in U.S. Pat. No. 6,391,379. Although this process approach is attractive, it has not yet been implemented on a production scale. One of the principle technical obstacles to the successful implementation of a polymer slurry to serve as the primary cathode layer is the difficulty coating edges and corners of the anode with slurry. These materials tend to pull away from corners and edges due to surface energy effects. The resulting thin coverage at corner and edges results in reduced reliability of the device. The magnitude of the force pulling the liquid away from the edge is given by the Young and Laplace Equation:

$$\Delta p = \gamma/r$$

Wherein
  $\Delta p$=the pressure difference causing the liquid or slurry to recede from an edge
  $\gamma$=the surface tension of the liquid or slurry; and
  r=the radius of curvature of the edge.

This effect is illustrated in FIG. 1.

During application of the primary cathode material, the liquid phase of a suspension will enter the pores of the anode. If the particles in the suspension are larger than the pores, they will be prevented from entering the anode body and can buildup on the external surface of the anode. Thus external buildup on the anode after application of the slurry is somewhat dependent on the void volume (i.e. density) of the anode. Variations in local density of the anode can result in non-uniform coating, especially on the corners and edges of an anode.

It is also common that the mechanically press-formed anodes exhibit small protrusions, or "lips", analogous to parting lines on injection molded plastic pieces where the valve metal powder formed into the clearance where tooling components meet. Practical tooling design dictates that the tooling joint occurs at the edges of the pellet. This situation exacerbates the previously discussed tendency of the cathode material to pull away from the edges of the pellet, making uniform coverage of a polymer coating over the entire anode body even more difficult.

The reliability of a solid electrolytic capacitor is also degraded due to differences in coefficients of thermal expansion between the anode bodies and encapsulates material. These mismatches lead to thermo-mechanical stresses on the anode/dielectric during surface mounting of the capacitor device onto a circuit board. These stresses are greatest at the corners and edges of the anode body. Capacitor manufacturers rely on the external cathode coatings of carbon and silver paint to reduce or distribute the stress, especially at high stress points like corners and edges of the anode. However, per the previously discussed anomaly of thin cathode layer coverage on corners and edges of the pellet, there is a direct relationship between the curvature of the corners and edges of the pellet and the reliability of the device.

Capacitor manufacturers have also employed rectangular prism anode designs with designated rounded or chamfered edges for various performance related reasons. For example, in order to reduce the thermo-mechanical stress on edges of surface mount devices after encapsulation, an anode with chamfered edges at the top of the anode was described by D. M. Edson and J. B. Fortin in a paper published in the Capacitor and Resistor Symposium in March 1994 entitled "*Improving Thermal Shock Resistance of Surface Mount Tantalum Capacitors*." These authors used finite element analysis and failure site identification techniques to demonstrate that most failures which occurred during surface mounting were along the top edges of the anode (surface where the lead projects). A modified anode design, as depicted in FIG. 3, was reported to reduce the surface mount failure rate.

Anode bodies with 4 curved or chamfered edges, those parallel to the anode lead wire, have been observed in capacitors on the market. (See FIG. 4). These anode bodies are pressed in a die set that compacts in the same direction of the anode lead wire axis (termed "axial pressing"), which is typically in the long axis of the compact. By nature of the axial pressing process, greater flexibility in anode geometries of interest to capacitor manufacturers can be achieved, but the process has a number of associated drawbacks. Primarily, axially compacted pellets still exhibit sharp corners and/or edges at the ends of the pellet, regardless of profile that may contain rounded edges. Secondarily, the axial pressing process often leads to problems such as smearing/burnishing of the powder on the exterior pellet surface (FIG. 7) as it slides inside the die cavity during compaction and ejection process steps. Additionally, axially pressed anodes often exhibit a significant density gradient and porosity gradient in the direction of compaction. Powder smearing and high density regions make it more difficult for the liquid phase of a slurry or suspension to enter the pores of the anode evenly, exacerbating the problems of poor cathode coverage.

Another approach to improving corner coverage would be to eliminate the side edges through the use of cylindrical or obround anode geometries. However cylindrical anodes are volumetrically inefficient when used in industry standard case dimensions for surface mount product. Obround anodes are more volumetrically efficient, but pressing these anodes is generally done on an axial style press. This leads to the previously discussed anomalies of axially pressed pellets.

Axial leaded hermetically sealed solid electrolytic capacitors are extremely reliable capacitors. This is because the only heat introduced in soldering the device to the circuit board is to the leads, which is done on the opposite side of the circuit board from the part, thus the temperature rise inside the device is small, and damaging forces (mismatch in coefficients of thermal expansion) created by this process are minimal. Compared to the forces created in the solder process for surface mount capacitors (SMT) where the entire capacitor package is immersed into the high thermal profile of the solder, these forces should never create failures. This fact is born out in the recommended applications of these capacitors. Leaded capacitors may be used up to 80% of its nameplate voltage, whereas the SMT product is limited to 50% of its nameplate voltage.

A reliability issue for these leaded products is the susceptibility to mechanical forces created in handling of the parts. As loose pieces are handled, there is a potential of dropping the device, crimping the device, or pressing on the device, in which the internal damage may not be detectable. If the piece survives the initial electrical testing, the flaw created by the physical force can grow and become a circuit failure at a later point in time.

BRIEF DESCRIPTION OF THE INVENTION

This invention is based upon the following postulates, derived from the observations supra and other research.

Provided are abrasive processes to erode flashing and sharp edges and corners, also anode surface formations such as artifacts of the pressing process, and provide more open and accessible faces for further processing.

An anode with rounded corners and edges allows for improved coating of corners and edges by cathode layers in an electrolytic capacitor.

An anode with rounded corners and edges reduces mechanical, electrical, and thermal stress on the anode and associated cathode layers.

This invention relates to a process for preparing the surfaces of anode bodies used in solid electrolytic capacitors. More particularly, the invention relates to a process employed to remove a thin layer of anode body material that is smeared/burnished as a result of being in contact with, and moving across, the forming die wall during the compaction and/or ejection process.

An anode with open pores on its exterior surfaces allows cathode materials suspended in liquid phase to enter all exposed surfaces of the anode body resulting in more uniform coverage of the cathode layer material.

Additionally, the invention relates to process employed to alter the surface topography of anode bodies used in solid electrolytic capacitors. More particularly, the invention relates to a process employed to roughen the substantially flat surfaces of anode bodies that are otherwise matching in form to the compression tooling utilized to manufacture the anode body.

An anode with exterior surfaces that are relatively rougher than common flat surfaced forming tooling allows for more uniform coating of exterior polymer cathode material.

It is an object of the present invention to provide a method for modifying the corners and edges of capacitor anodes to improve cathode layer coverage uniformity, especially the primary cathode layer.

It is another object of this invention to provide a method for modifying the corners and edges of capacitor anodes in order to successfully apply conductive polymer slurries.

It is yet another object of this invention to provide a method for removing the thin layer of smeared/burnished anode material from the surface of capacitor anodes to improve coverage of the primary cathode material by eliminating regions where the liquid phase of a cathode suspension, or the particles therein, otherwise could not enter the pores of the anode body.

It is yet another object of this invention to provide a method for increasing the roughness of the anode body surfaces in order to improve the uniformity of cathode layer coverage.

Through diligent research the present inventors have found that abrasive processes can be usefully employed to modify the corner and edges of anode pellets to improve uniformity of cathode layer coverage, and thereby reduce electrical leakage of the capacitor (FIG. 2).

Additionally, the present inventors have found that the abrasive process can be employed to remove the thin layer of smeared anode material from the surface of the anode (FIG. 8) to further improve cathode layer coverage by eliminating regions where the liquid phase of a suspension of a conductive polymer otherwise could not enter the pores of the anode body.

Still further, the present inventors have found that the abrasive process can be employed to beneficially change the surface topography of the anode body. The surface topography of the anode body reflects that of the tooling used to compact the anode body, which must be flat enough to prevent the raw anode body material from adhering to the tooling during the high pressure compaction process. However, the resulting anode surface topography is more hydrophobic and resists wetting to the liquid phase cathode material. Employing an abrasive process on the pressed anode body results in an increase in roughness of the anode body surfaces beyond that which can be generated by the compaction tooling; this improves cathode layer thickness uniformity.

A particularly preferred embodiment is provided in a capacitor precursor body which has been subjected to an abrasion treatment process Yet another particularly preferred embodiment is provided in process for forming a capacitor including: pressing a conductor to form a pellet; treating the pellet to an abrasion treatment process; forming a dielectric on the conductor; and forming a second conductor on the dielectric

DETAILED DESCRIPTION OF THE INVENTION

Figure 5:
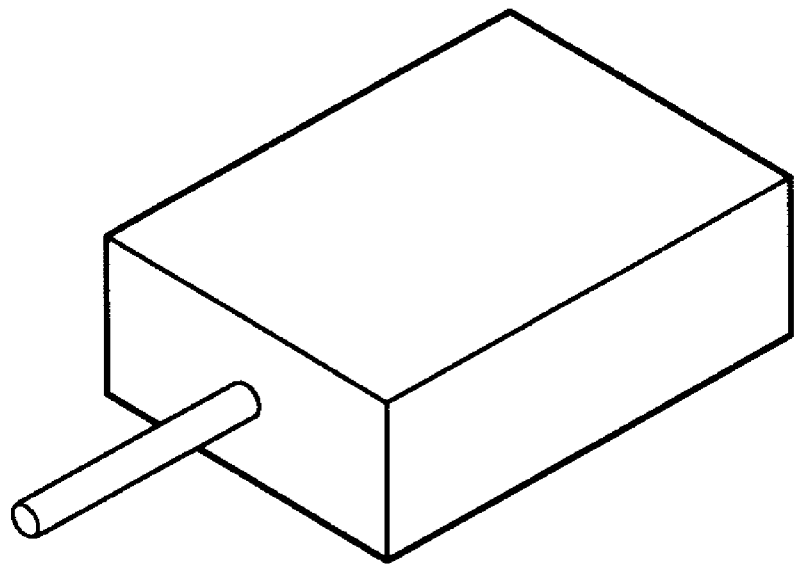
FIG. 5 is a depiction of a typical compacted anode pellet as pressed.
Figure 6:
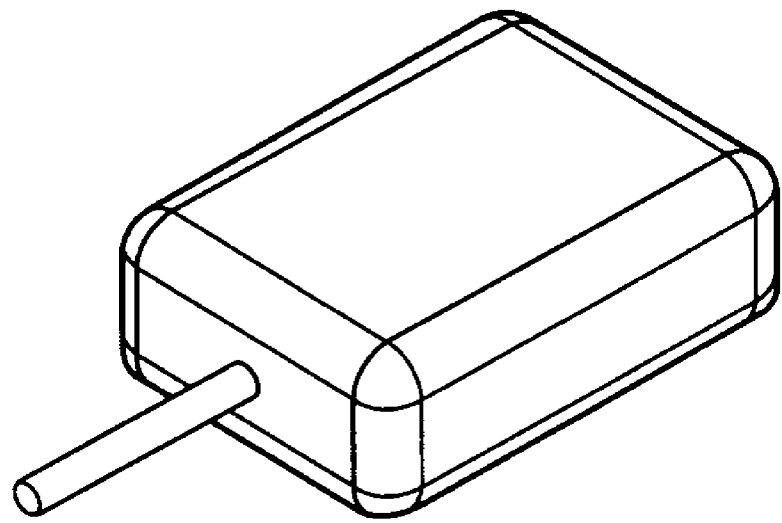
FIG. 6 is a depiction of a typical compacted anode pellet after abrasive processing.
Figure 7:
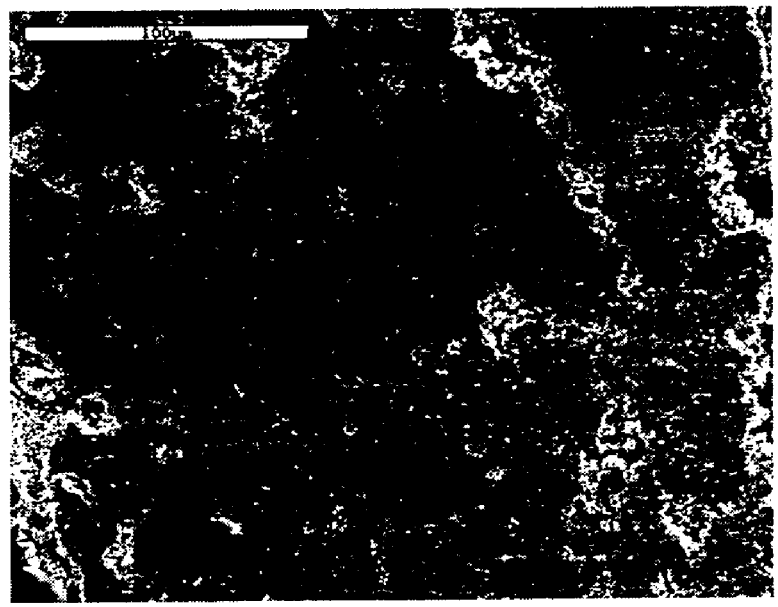
FIG. 7 is a photo of compacted anode pellet surface with smeared/burnished finish.
Figure 8:
FIG. 8 is a photo of compacted anode pellet surface without smeared/burnished finish.

Porous pellets are prepared by compacting powder to form porous anode bodies (FIG. 5). The pellets may be made from any suitable conductive material. Preferred materials include metals, conductive metal oxides or conductive metal nitrides. More preferably the anode comprises a valve metal, conductive valve metal oxide or a conductive metal nitride with preferred valve metals being tantalum, aluminum, niobium, hafnium, zirconium, titanium, tungsten and alloys of these elements. Tantalum and niobium oxide are the preferred materials. Tantalum is the most preferred material. Many types of binders or lubricants, such as stearic acid, polypropylene carbonate, polyethylene carbonate, and N,N'-ethylene distearylamide, polyalkylene carbonates and polyethyleneglycol, can be incorporated into the anodes and later removed either by soaking or thermal decomposition. A particularly preferred polyethylene carbonate is QPAC 25 and a particularly preferred polypropylene carbonate is QPAC 40. A particularly preferred N,N'-ethylene distearylamide is Acrowax C. The compacted pellets may then be processed using an abrasive process, in which contact among the compacted pellets, or among pellets and grinding media (sand, milling media such as metal/ceramic beads, sintered tantalum pellets, $Al_2O_3$, SiC, Zr, synthetic plastic fragments, nut shells, ground hardwood, pressurized liquid, etc.) serves to break down the corners, edges, and surfaces of the pellets (FIG. 6). Grinding media is a material, also referred to as milling media, which acts to abrade an item placed therein and moved. The binder is removed prior to or after the abrasion treatment process.

In general, the abrasive process employs the mechanical means, preferably but not limited to, tumbling a large volume of pellets in a cylindrical barrel shaped device made from lined or unlined metal, rigid plastic or ceramic rotating about its primary axis situated substantially horizontal. Vibrating, blasting, and grinding with milling media may be employed to equivalently achieve abrasive results indicative of those processes. Anode tumbling without added media, as described here, is the preferred method because the nature of the process dictates that material is removed from the anode bodies' corners, edges, and surfaces—in descending degree by nature of their geometric exposure. Additionally, tumbling as described here is preferred because it achieves the desired results without the need to use any foreign material that could degrade the purity of the anode bodies such as by inclusion in the pores, nor needs additional processing to be removed or separated from the anode bodies.

The pellets are then sintered to bond the compacted powder particles together into solid anode bodies that still possess their porous construction.

The sintered pellet is then anodized using standard procedures, including but not limited to, those described in U.S. Pat. No. 7,248,462 to form the oxide film which serves as the dielectric of the capacitor. The internal surfaces of the anodic oxide film are next coated with a primary cathode layer. Manganese dioxide may be applied as a primary cathode layer by applying manganous nitrate solution and converting the nitrate to manganese dioxide via heating in a pyrolysis oven. Typically the conversion step is carried out between 250° and 300° C. Alternatively, an intrinsically conductive polymer can be employed as the primary cathode layer. The conductive polymer material is typically applied as a monomer using either a chemical oxidative process such as is described in U.S. Pat. No. 6,001,281 or by applying a preformed polymer slurry preferably of polythiophene, polypyrrole or polyaniline such as is described in U.S. Pat. No. 6,391,379. In the case of a chemical oxidative process, byproducts of the reaction are removed by washing and typically multiple applications and washings are required prior to a reanodization process used to isolate the defect sites in the dielectric. The pellets are then placed in suitable electrolyte bath, for instance a dilute aqueous phosphoric acid solution with conductivity in the range 50 to 4000 micoS/cm. Voltage is applied to drive the process which causes isolation and healing of the dielectric flaw sites This process may not be required in the case of applying a preformed (prepolymerized) polymer slurry to the anodes. The process is repeated to insure complete coverage of the internal and external dielectric surfaces. The components are subsequently dipped in a carbon suspension to coat the external surfaces of the primary cathode material. A silver layer applied to the device with a commercial silver paint to form an external coating.

Figure 1:
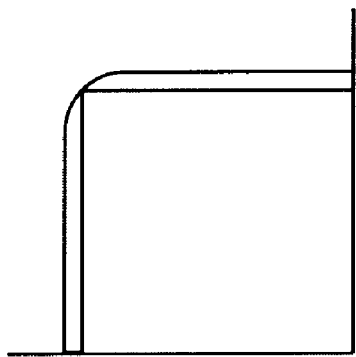
FIG. 1 is a depiction of non-uniform cathode layer coverage across sharp corner/edge.
Figure 2:
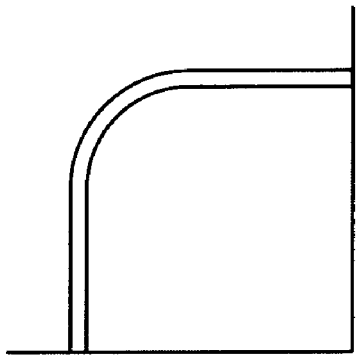
FIG. 2 is a depiction of uniform cathode layer coverage across curved corner/edge.
Figure 3:
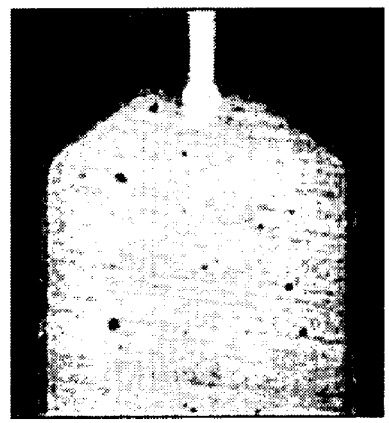
FIG. 3 is a photograph of a Prior Art anode pellet with 2 chamfered edges.
Figure 4:
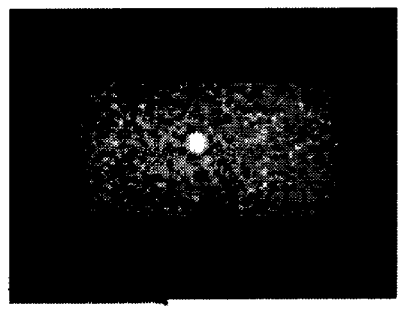
FIG. 4 is a photograph of a Prior Art anode pellet with 4 curved edges.

FIG. 1 depicts the manner in which a liquid or slurry pulls away from an edge or corner due to surface tension effects. Especially in the case of capacitors coated with polymer slurry, the cathode failure site occurs predominantly on the corners of the anode which are poorly coated by the polymer slurry due to surface tension of the more viscous slurry.

Polymer slurries of intrinsically conductive polymers are an alternative coating methodology to the formation of polymer from a monomer and catalyst on the surface of the oxidized pellet. Slurries may be applied using a cross-linking agent as disclosed in U.S. Pat. No. 6,451,074. The use of slurries reduces the number of coating steps when making the capacitor and reduces the loss of monomer due to contamination. U.S. Published Application No. 2006/0236531 discloses polythiophene particles with filler as a coating material of conductive polymer. Any intrinsically conductive polymer may be used. Polyaniline may be preferred due to ease of handling. Coating thickness should be at least 0.25 micrometers, preferably at least 1 micrometer and optimally at least 3 micrometers to obtain complete coverage of all appropriate surfaces. The use of anode pellets exhibiting curvature where the primary surfaces meet, particularly at the end and/or sides away from the anode lead wire, allows reliable mechanical dipping into the slurry with minimal deposition of polymer on the anode lead. The capacitor precursor then may be coated with graphite and Ag, a cathode lead attached and final assembly performed.

It is preferred that the pellet be abraded until the edge sharpness is removed. The edge sharpness is considered removed herein when the pellet has a minimum radius of curvature of at least 0.0076 cm (0.003 inches). More preferably the pellet has a minimum radius of curvature of at least 0.0127 cm (0.005 inches) and most preferably at least 0.025 cm (0.010 inches).

A fluted anode is one which has surfaces which are not substantially flat. The variations in the surface may be, but are not necessarily, symmetrical or repeated in a pattern. Examples of fluted anodes may be found in U.S. Pat. Nos. 7,154,742; 7,116,548; 6,191,936; and, 5,949,639. The capacitors disclosed in these references are pressed to have substantially flat ends where anode lead projects and at the opposite end. Most have flat sides except for the penetrations into the body of the anode. Multiple sharp edges are present and present challenges when coatings are applied. Modifications of the external surfaces to remove sharp corners and edges results in improved coating. Internal surfaces, meaning those wholly within the interstices of the flutes (i.e. at acute not obtuse angles), need not be modified. In preferred embodiments, multiple flat wires are used as anode leads.

Figure 11:
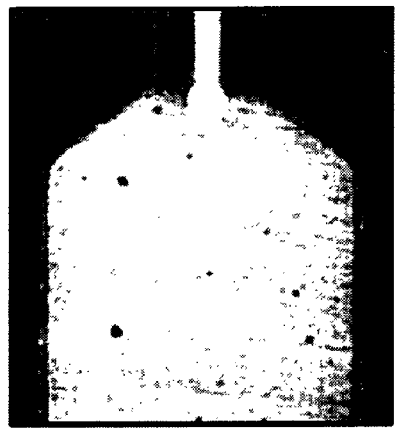
FIG. 11 is a depiction of prior art top edge chamfered anode.
Figure 12:
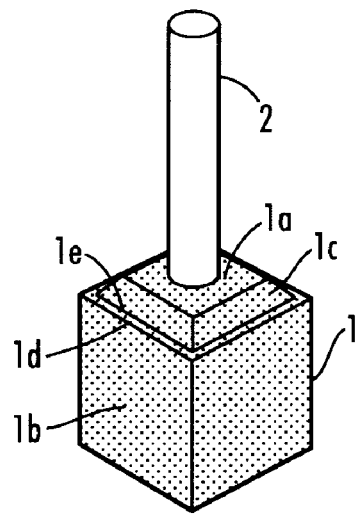
FIG. 12 is a depiction of prior art top edge chamfered anode.
Figure 13:
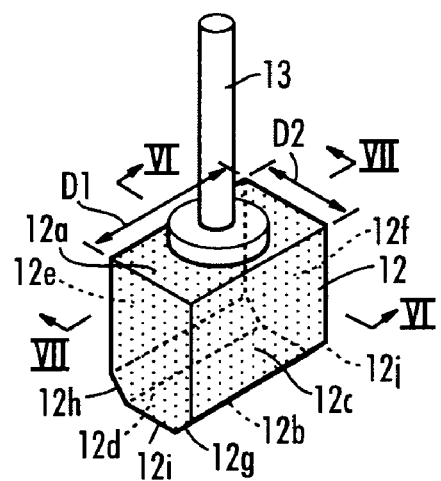
FIG. 13 is a depiction of prior art bottom edge chamfered anode.

FIG. 11 depicts prior art in which the top edges of a surface mount capacitor were chamfered to reduce stress on those edges. FIG. 12 is a depiction of an anode with chamfered top edges as described in U.S. Pat. No. 5,959,831 (Maeda, et al.). FIG. 13 depicts chamfering of bottom edges as depicted in US 2005/0231895 A1. FIG. 14 is a picture of capacitors following a breakdown test indicating the failures occurred on the corners of the anode. In a breakdown voltage test, a power supply, resistor, fuse, and capacitor are placed in series. The voltage applied to the capacitor is increased until the capacitor breaks down as indicated by the blown fuse. Especially in the case of capacitors with polymer slurry cathode the failure site occurs predominantly on the corners of the anode which are poorly coated by the polymer slurry.

Figure 21:
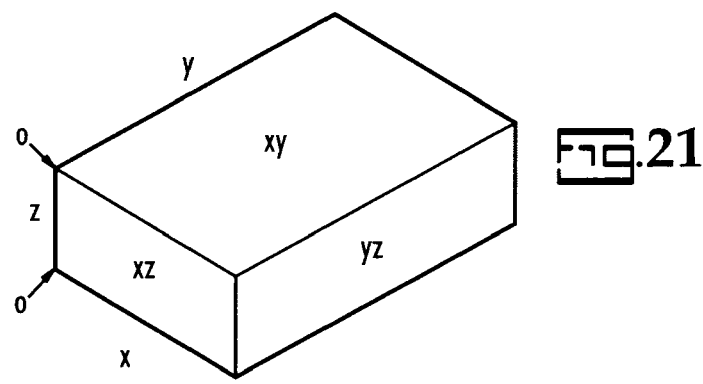
FIG. 21 depicts a rectangular prism for illustration of surfaces, edges and corners.

FIG. 21 shows a rectangular prism or a parallelopiped. The X, Y, and Z axes are defined with respect to origin "O." The exposed surfaces are labeled XY, XZ, and YZ. An edge is defined as the intersection of two surfaces. A corner (or point) is defined as the intersection of three surfaces or three edges.

Figure 22:
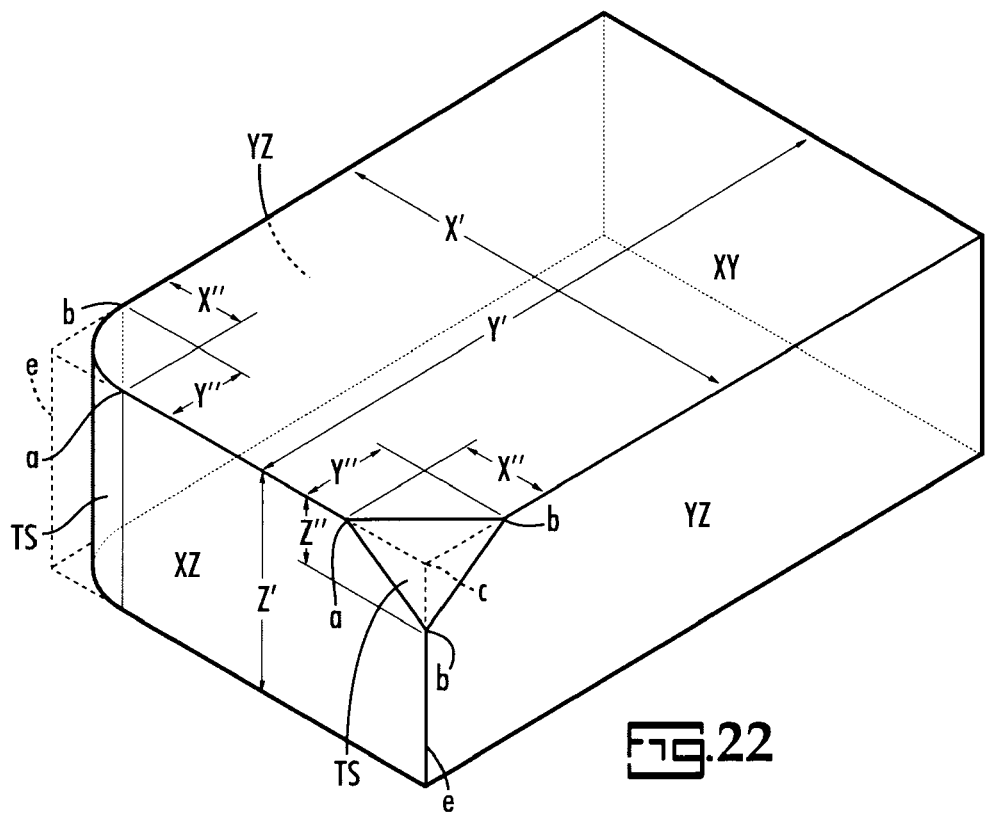
FIG. 22 depicts a rectangular prism in perspective view.

Modification of an edge can be defined by reference to FIG. 22. FIG. 22 represents an anode in perspective view. A surface XZ with a length X' and width Z' represents a first external surface of an anode. A surface YZ with a length Y' and width Z' represents a second external surface of an anode. For conventional anodes XZ and YZ meet to form a right angle at an edge. In an edge modified design the first surface XZ will deviate at point a and distance X" from the edge, e, which is the projected intersection of XZ and YZ. The second surface of the anode will deviate from YZ at point b and distance Y" from e. This deviation creates at least one additional surface, herein defined as a transition surface, TS. In one embodiment the deviation is a straight diagonal line between points a and b wherein the transition surface creates a chamfer. In another embodiment the transition surface is a non-linear, curved, or radiused edge. Edge modified designs as defined here refers to any deviation of the external surface from XZ and YZ such that:

0.03 mm<X"<0.5X' and 0.03 mm<Y"<0.5Y'.

The concept can be extended to a third dimension of a conventional rectangular prism. A corner, c, is defined by the projected intersection of three surfaces YZ, XZ and XY. The surface XZ with a length X' and width Z' representing an external surface of an anode. In a corner modified design the surface XZ will also deviate at point d and distance Z" from c. A corner modified design as defined herein refers to any deviation of the external surfaces such that:

0.03 mm<X"<0.5X' and 0.03 mm<Y"<0.5Y' and 0.03 mm<Z"<0.5Z'.

In a conventional SMT the anode shape is a regular rectangular prism as illustrated in FIG. 21. The surfaces all intersect at right angles (or approximations thereof), providing six surfaces and twelve edges.

According to this invention, most or all of the edges are modified to form transition surfaces. The transitions may be flat as in a traditional chamfer or bevel. Alternately, the transition may form multiple chamfers including, in the limit, a curved surface such as would be obtained using a corner round router bit.

When rounded edges intersect, a quarter of a hemisphere is formed which maybe regular, as when all radii of generation are equal or compound when the radii of the generating curves differ.

Referring again to FIG. 22, it is apparent that the size of a straight bevel or chamfer can be defined in terms of X", Y", and/or Z". Since there are twelve edges and eight corners formed by six surfaces, a great variety of shapes can be formed when the lengths X, Y and Z differ from each other or when different edges are chamfered or when only corners are chamfered. Depending upon the size of the anode-case size-different transition surface shapes and sizes are found to be preferred.

Figure 14A:
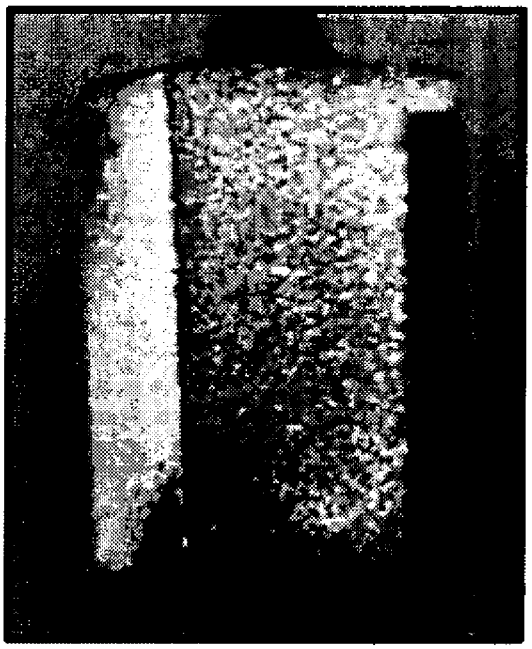
FIG. 14A and FIG. 14B indicate the failure site location of anodes following a breakdown voltage test.
Figure 14B:
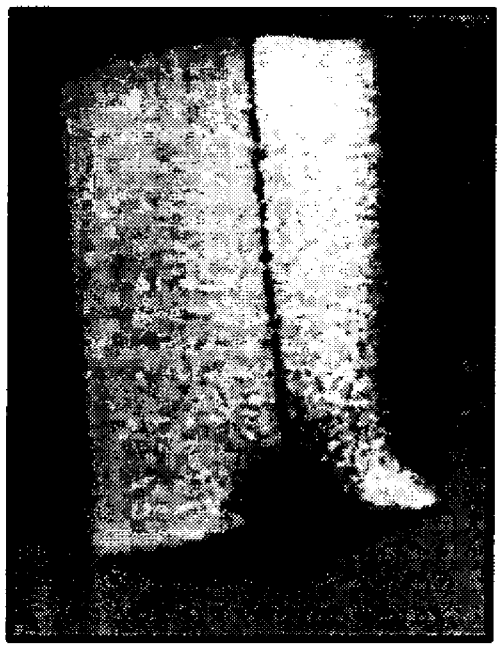
Figure 15:
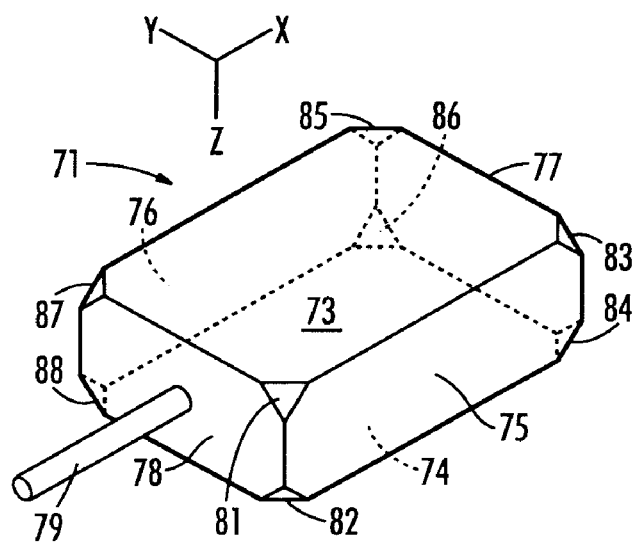
FIG. 15 is a depiction of a corner chamfer anode design.

As an example of a body having a transition surface, reference is made to FIG. 15. Anode body 71, having six planar sides 73, 74, 75, 76, 77, and 78 and an anode lead 79 has been chamfered at each corner to provide transitional planar surfaces 81, 82, 83, 84, 85, 86, 87, and 88. This shape directly addresses the problem with corner coating as illustrated in FIG. 14A and FIG. 14B. This is a corner chamfer anode.

Figure 16:
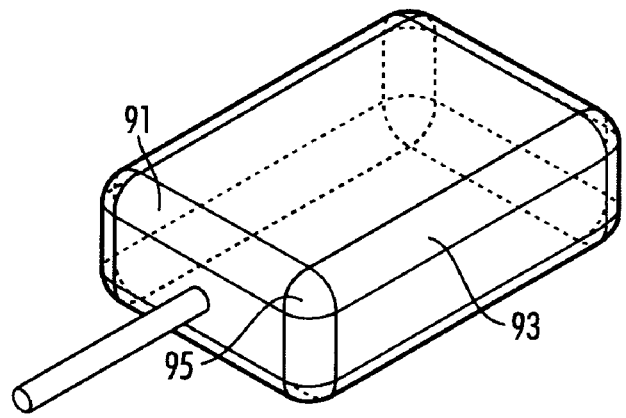
FIG. 16 is a depiction of an edgeless rectangular anode.

When edges and corners are all curved, the result is an edgeless shape as shown in FIG. 16. Three transitional surfaces are present, a short side curved transitioned surface 91, a long side curved transitional surface 93 and a corner quarter hemisphere 95. In the preferred embodiment, all radii of generation are equal but such is not necessary. For small case sizes a greater radius in the Z direction may be preferred.

Figure 17:
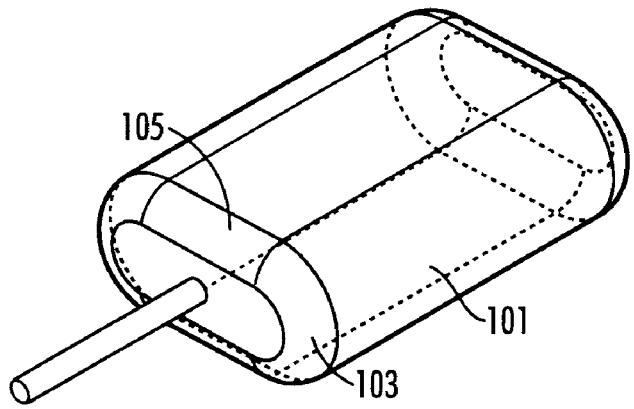
FIG. 17 is a depiction of an edgeless obround anode.

When the curvature at the edges in the YZ surface is expanded to become a continuous curve, the resultant figure is an obround prism as shown in FIG. 17. The YZ surface has been replaced with a curved surface, such as semicircular in cross-section. In the preferred embodiment, the transition surfaces form the XY surface and from the semicircular side are radiused into the XZ surface (cf. 103) and the transition surface from the XY surface (cf. 105) are radiused into the XZ surface. Such an anode has no sharp edges save for some flashing at the points of juncture of the dice employed. The XY surface of an oblong prism may be flat or curved.

Figure 18:
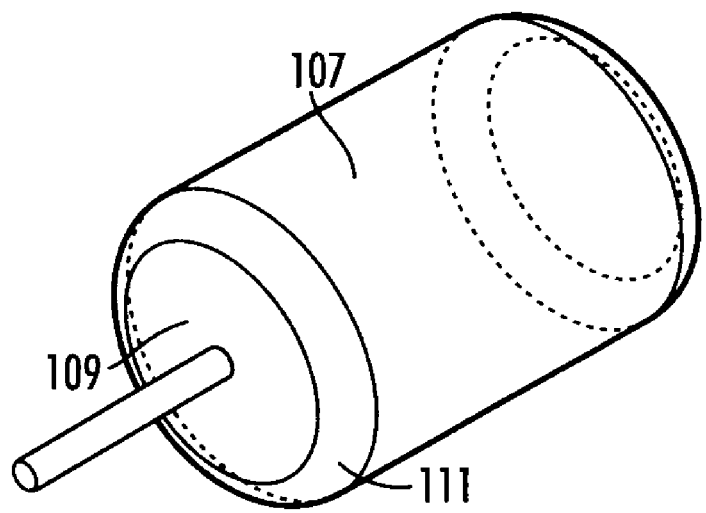
FIG. 18 is a depiction of an edgeless cylindrical anode.

Extrapolation of the edgeless obround shape of FIG. 17 is the edgeless cylinder of FIG. 18. A cylindrical anode has traditional round sides 107, but the transition surface 111 to the flat top 109 (and bottom, not shown) is chamfered or, in the drawing, rounded or curved to make a smooth transition from side to top.

When the basic prism shape is obround, the edges and corners may have consistent or changing radii, but the chord for the curve is defined using the same criteria as for a chamfered surface. When the figure is a cylinder, the radius of the circle of origin becomes one length, and the height of the cylinder becomes the other length, i.e., the intersection of planar surface and circumferential surface is characterized as 0.03 mm<R<r and 0.03 mm<H<h/2 where r and h are the radius of the circle of origination and H the height of the cylinder.

The edgeless cylinder has particular application in hermetically sealed leaded devices.

Figure 19:
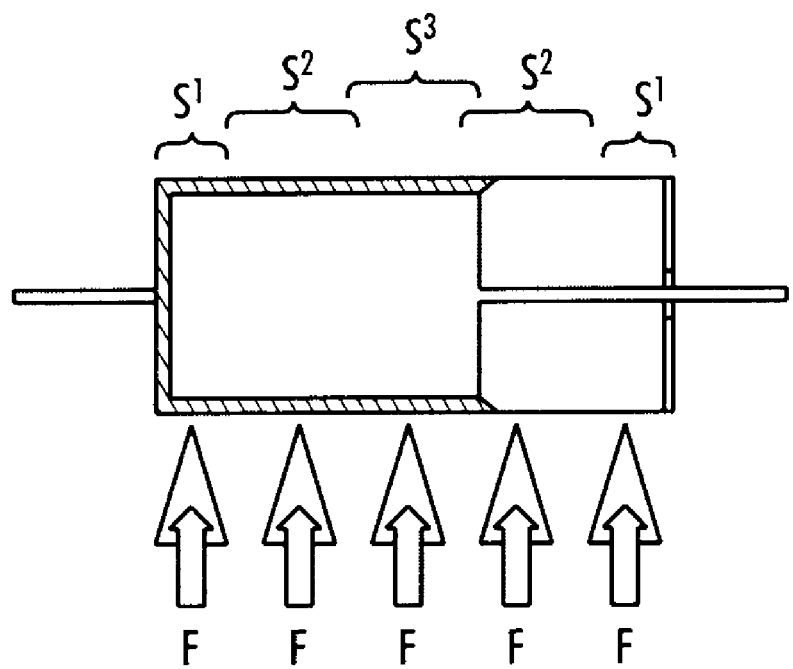
FIG. 19 depicts the mechanical forces acting on a hermetically sealed device.

Failure site analysis reveals that the vast majority of failures, up to 95%, will appear on the edges of the cylindrical anode. These edges are most susceptible to any outside forces applied to the case wall (FIG. 19). In between these edges, the pellet structure offers a strong resistive structure that will spread the force and absorb it. In between the edge and the sealed, top of the case, the case can compress to absorb the force. At the edges, the forces can create a fracturing force on the pellet. The relative stresses are in the order $S^1$, $<S^2$, $<S^3$. The top edge (nearest the anode seal) is more susceptible than the bottom edge (nearest the cathode lead) as the closed end of the barrel adds stiffness here.

Figure 20:
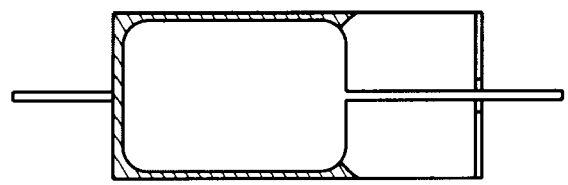
FIG. 20 depicts edge rounding of cylindrical anode in hermetically sealed construction.

In order to mitigate this failure mechanism the edges of the pellet can be rounded. By eliminating the sharp edge (FIG. 20), the amount of force required to fracture or chip the pellet increases tremendously. Once the pellet is soldered in the case, the sharp edges would have been eliminated and replaced with a tapering solder thickness. The radiused or rounded elements nearest the outer diameter have capabilities of spreading blunt forces through the case. The radiused elements furthest from the outer diameter have thicker solder which creates additional buffering.

Figure 23:
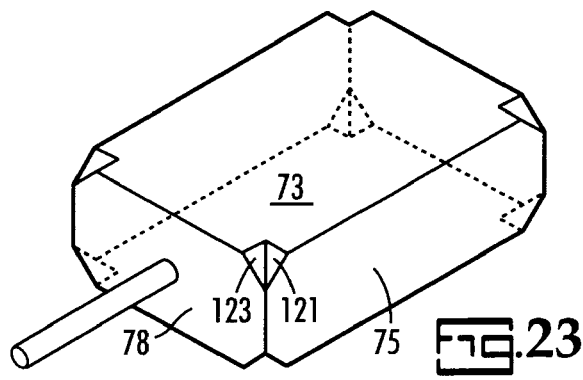
FIG. 23 is a depiction of a corner cut anode design
Figure 24:
FIG. 24 depicts polymer coverage of corner cut anodes

It has been found that a second approach to enhancing coverage is surprisingly effective. An anode having cut-away portions at the corners—hereinafter a corner cut anode—is effective in collecting conductive polymer at the corners during the coating process. FIG. 23 shows a preferred corner cut anode sintered body. At the juncture of three surfaces 73, 75 and 78, two cuts are made to create two additional transitional surfaces, 121 and 123. This pattern is repeated at the other seven corners to form "pockets." The improvement may be seen in FIG. 24 when contrasted with FIG. 20 and FIG. 25. While not being bound by any theory, it is seemed that monomer, and subsequently polymer, accumulates on the surfaces of the transition surface 121, 123 and compensates for the thin or incomplete layers found in standard rectangular parallelepiped shape for anodes. The corner cut anode seems particularly suitable for dipping in polymer slurries.

Polymer slurries of intrinsically conductive polymers are an alternative coating methodology to the formation of polymer from a monomer and catalyst on the surface of the oxidized pellet. Slurries may be applied using a cross-linking agent as disclosed in U.S. Pat. No. 6,451,074. The use of slurries reduces the number of coating steps when making the capacitor and reduces the loss of monomer due to contamination. U.S. Published Application No. 2006/02336531 discloses polythiophene particles with filler as a coating material of conductive polymer. Any intrinsically conductive polymer may be used. Polyaniline is preferred due to ease of handling. Coating thickness should be at least 0.25 micrometers, preferably at least 1 micrometer and optimally at least 3 micrometers to obtain complete coverage of all edges. The use of anode pellets with transition surfaces at the end and/or sides away from the anode lead allows reliable mechanical dipping into the slurry with minimal deposition of polymer on the anode lead. The capacitor precursor then may be coated with graphite and Ag, a cathode lead attached and final assembly performed.

A fluted anode is one which has surfaces which are not substantially flat. The variations in the surface may be, but are not necessarily symmetrical or repeated in a pattern. Examples of fluted anodes may be found in U.S. Pat. Nos. 7,154,742; 7,116,548; 6,191,936; and, 5,949,639. The capacitors disclosed in these references are pressed to have substantially flat ends where anode lead projects and at the opposite end. Most have flat sides except for the penetrations into the body of the anode. Multiple sharp edges are present and present challenges when coatings are applied.

Modifications of the external surfaces to remove sharp angles results in improved coating. The edges and/or corners may be chamfered or curved in the manner of FIGS. 15 and 16 to achieve a more uniform coating of the polymer. Triangular corners as shown in FIG. 15 and notched corners such as shown in FIG. 23 are also preferred. Internal surfaces, meaning those wholly within the interstices of the flutes need not be modified. In preferred embodiments, multiple flat wires are used as anode leads.

Example 1

Figure 25:
FIG. 25 depicts polymer coverage of conventional anode with dielectric show through evident at corners due to incomplete polymer coverage.
Figure 26:
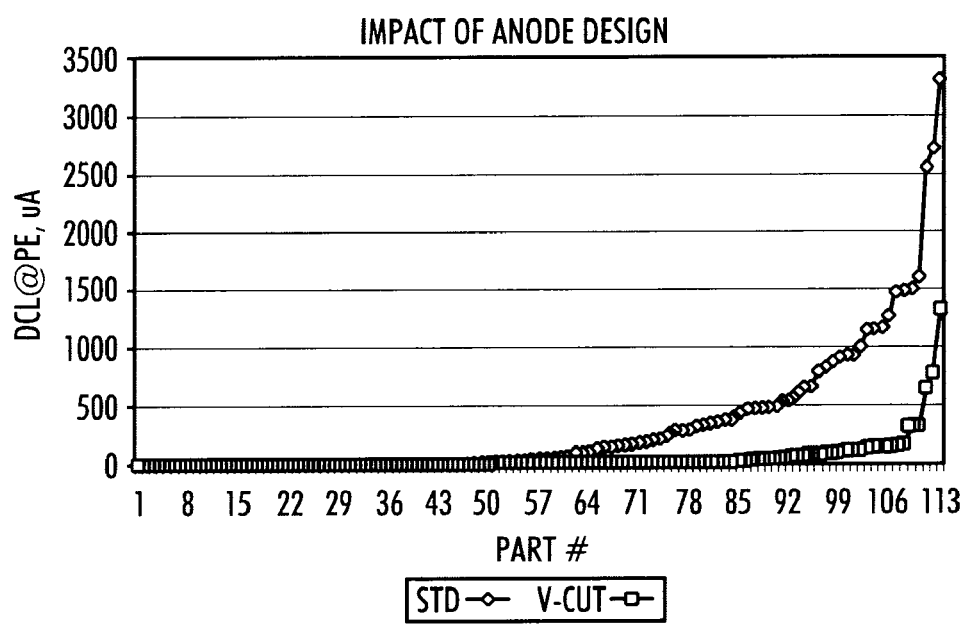
FIG. 26 plots leakage for standard and corner cut anodes

Commercial electronic grade 22,000 CV/g tantalum powder was pressed to form anodes to a density of 5.5 g/cc with dimensions 4.70×3.25×1.68 mm using a radial action press. The punches of the press were modified to create a notch or v-cut in each corner of the anode as depicted in FIG. 23. This modification to the corners is referred to as corner cut anode designs. The sintered anodes were anodized at 100 volts in an aqueous phosphoric acid electrolyte maintained at 80° C. The parts were subsequently dipped in liquid suspensions containing pre-polymerized polyethelyenedioxthiophene (PEDT). Photomicrographs were taken to determine the degree of polymer coverage on the corners of the anodes (FIG. 25). After application of a conductive polymer slurry the parts were dipped in a carbon suspension used for commercial tantalum conductive polymer capacitors. The anodes were dipped in an electronics grade silver paint prior to assembly and encapsulation to form surface mount tantalum capacitors. After encapsulation 25 volts was applied to the capacitors and leakage was read through a 1 k ohm resistor after allowing 60 seconds for the capacitors to charge. The results were plotted in FIG. 26.

Comparative Example 1

Figure 27:
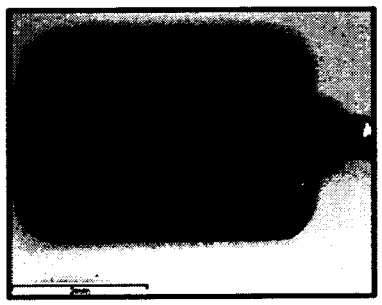
FIG. 27 depicts polymer coverage on anodes with rounded corners.

Commercial electronic grade 13,000 CV/g tantalum powder was pressed to a density of 5.5 g/cc with dimensions 4.70×3.25×1.70 mm using a radial action press. Conventional punches were used which created well defined corners typical of anodes used in the industry. The sintered anodes were anodized to 130 volts in an aqueous phosphoric acid electrolyte maintained at 80° C. The parts were subsequently dipped in liquid suspensions containing pre-polymerized polyethelyenedioxthiophene (PEDT). Photomicrographs were taken to determine the degree of polymer coverage on the corners of the anodes (FIG. 27). After application of the conductive polymer slurry the parts were dipped in a carbon suspension used for commercial tantalum conductive polymer capacitors. The anodes were dipped in an electronics grade silver paint prior to assembly and encapsulation to form surface mount tantalum capacitors. After encapsulation 25 volts was applied to the capacitors and leakage was read through a 1 k ohm resistor after allowing 60 seconds for the capacitors to charge. The results and comparison were plotted in FIG. 26 wherein DCL is direct current leakage and PE is post-encapsulation. A comparison of the polymer coverage and leakage distributions after encapsulation demonstrates the improvements obtained with the corner cut anode design relative to prior art.

Example 2

Figure 28:
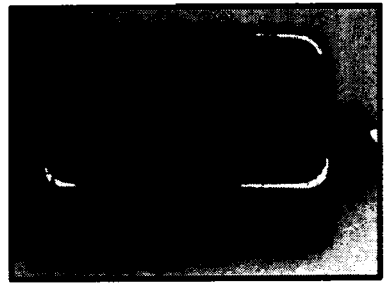
FIG. 28 depicts polymer coverage on anodes with conventional corners

Commercial electronic grade 13,000 CV/g tantalum powder was pressed to a density of 5.5 g/cc with dimensions 4.57×3.10×1.63 mm using a pill style press. The lead wire is attached after pressing with this type of press. The action of this style press generates anodes with rounded corners on one side of the anode. The corners on the opposite side of the anode are sharp, well defined corners. The sintered anodes were anodized to 130 volts in an aqueous phosphoric acid electrolyte maintained at 80° C. The parts were subsequently dipped in liquid suspensions containing pre-polymerized polyethelyenedioxthiophene (PEDT). Photomicrographs were taken to determine the degree of polymer coverage on the rounded corners of the anodes (FIG. 27). Photomicrographs taken of the opposite side of the anode demonstrates the poor polymer coverage on the sharp well defined corners of the anode (FIG. 28). These pictures clearly indicate the need to modify the corners of the anodes in order to obtain sufficient coverage using slurries or suspensions to apply cathode layers.

Comparative Example 2

Figure 29:
FIG. 29 depicts polymer coverage at the top of an obround anode pressed on an axial press.
Figure 30:
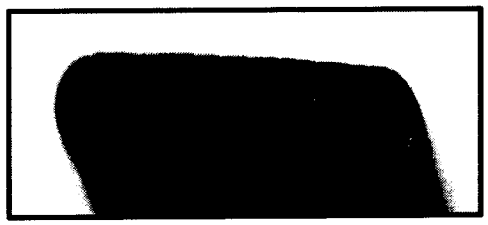
FIG. 30 depicts polymer coverage at the bottom of an obround anode pressed on an axial press.

In order to eliminate the corners completely an axial press was used to press obround anodes. Commercial electronic grade 22,000 CV/g tantalum powder was pressed to an average density of 5.5 g/cc with dimensions 4.70×3.25×0.81 mm. An obround shaped die was used to press an anode without corners. The sintered anodes were anodized to 100 volts in an aqueous phosphoric acid electrolyte maintained at 80° C. The parts were subsequently dipped in liquid suspensions containing pre-polymerized polyethelyenedioxthiophene (PEDT). Photomicrographs were taken to determine the degree of polymer coverage on the anodes. Polymer coverage at the top of the anode, where the density was less than 5.5 was acceptable (FIG. 29). However, at the bottom of the anode where the press density was greater than 5.5 the edges of the anode were not covered with polymer (FIG. 30). The density gradient observed in these anodes is characteristic of anodes produced on an axial press.

In the process of preparing anodes 50 kCV/gram Ta powder from H. C. Starck was mixed with N,N'ethylene diamine distearamide and pressed to form a rectangular parallelepipeds such as shown in FIG. 5. The pressed anode bodies were put into a tantalum lined grinding jar and rolled for 60 minutes at 20 rpm. The anode bodies were removed from the grinding jar and cleaned with compressed air, followed by sintering for 15 minutes at 1520° C. in a vacuum oven.

Figure 9:
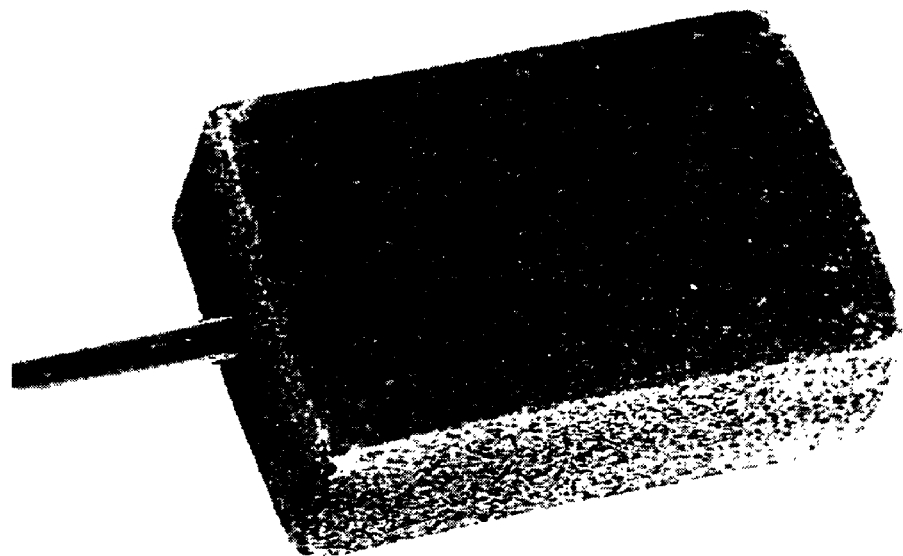
FIG. 9 is a scanning electron micrograph of an anode prior to further processing.
Figure 10:
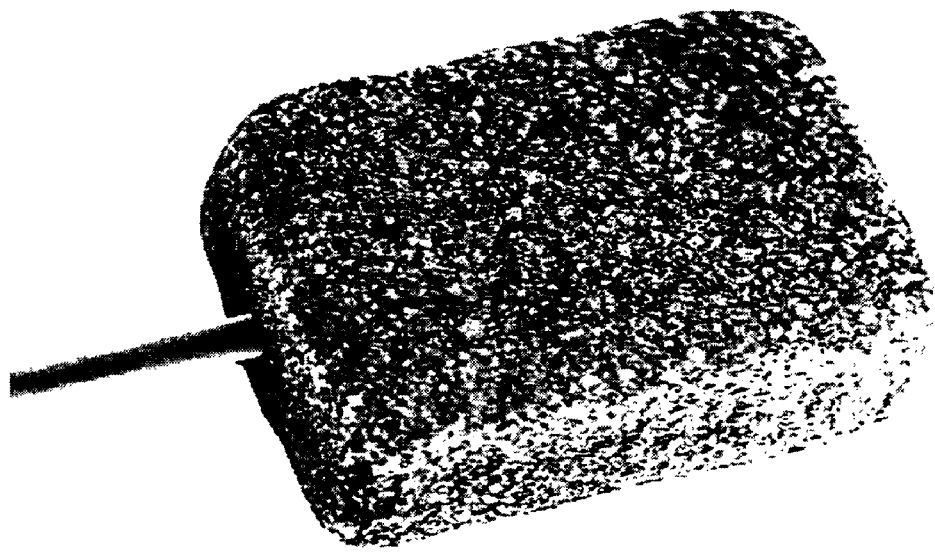
FIG. 10 is a scanning electron micrograph of a tumbled anode.

FIG. 9 shows an anode body before tumbling. FIG. 10 shows an anode body after tumbling.

Table 1 summarized the electrical results of Ta capacitors after surface mounting. The polymer slurry coated anodes processed using the tumbling process show the noticeable reduction in electrical short failures.

TABLE 1

Summary of Electrical Results of Ta Capacitors after Surface Mounting

| Process | Total pieces tested | Shorts (>1 mA) |
| --- | --- | --- |
| No tumble | 386 | 2 |
| Tumbled | 1403 | 0 |

The invention has been disclosed in regard to preferred examples and embodiments which do not limit the scope of the invention disclosed. Modifications apparent to those with skill in the art are subsumed within the scope and spirit of the invention.

INDUSTRIAL UTILITY

The disclosed invention provides a method of processing anode bodies that ultimately improves quality, reliability, and durability of capacitors in electronic devices.

What is claimed:

1. A capacitor precursor body comprising a pressed powder porous anode body which has been compacted and then subjected to an abrasion treatment process to remove corner material adjacent to at least one face thereby forming a corner adjacent said face with a radius of curvature of at least 0.0076 cm and wherein said capacitor precursor body further comprises a binder.

2. The capacitor precursor body of claim 1 comprising a conductor selected from a valve metal, a conductive oxide of said valve metal and a conductive nitride of said valve metal.

3. The capacitor precursor body of claim 2 wherein said valve metal is selected from the group consisting of Al, Ta, Nb, Ti, Zr, Hf, W.

4. The capacitor precursor body of claim 2 wherein said valve metal is selected from Ta, Nb and NbO.

5. The capacitor precursor body of claim 1 wherein said binder is selected from the group consisting of stearic acid, polyethylene carbonate, polypropylene carbonate, N,N'-ethylene diamine distearamide, alkyl resin, polyethylene glycol, ammonium barbonate, polybutyl methacrylate, chamfor, polypropylene carbonate and dimethyl sulfone.

6. The capacitor precursor body of claim 1 wherein the abrasive treatment process is selected from the group consisting of tumbling, vibrating, blasting and grinding.

7. The capacitor precursor body of claim 6 where said pressed powder porous anode body has been tumbled.

8. The capacitor precursor body of claim 1 wherein said pressed powder porous anode body has been tumbled in a grinding media.

9. The capacitor precursor body of claim 8 wherein said grinding media is selected from the group consisting of sand, metal/ceramic beads, pellets if same material as said body, $Al_2O_3$ pellets, SiC pellets, Zr pellets, synthetic plastic fragments, nut shells and ground hardwood.

10. The capacitor precursor body of claim 1 wherein said pressed powder porous anode body has been sintered.

11. The capacitor precursor body of claim 1 wherein said pressed powder porous anode body has been tumbled in a rotary jar.

12. The capacitor precursor body of claim 11 wherein said tumbling is prior to sintering.

13. The capacitor precursor body of claim 1 further comprising a dielectric.

14. The capacitor precursor body of claim 13 further comprising a conductive layer on said dielectric.

15. The capacitor precursor body of claim 14 wherein said conductive layer is a polymer.

16. A capacitor precursor body comprising a pressed powder porous anode body which has been compacted and then subjected to an abrasion treatment process wherein said pressed powder porous anode body has a minimum radius of curvature at a corner between adjacent faces of at least 0.0076 cm.

17. The capacitor precursor body of claim 16 wherein said curvature is least 0.0127 cm.

18. The capacitor precursor body of claim 17 wherein said curvature is least 0.025 cm.

19. A capacitor precursor body comprising a compacted powder porous anode body wherein said compacted powder porous anode body has been subjected to an abrasion treatment process and wherein an edge between adjacent faces of said compacted powder porous anode body has a minimum radius of curvature of at least 0.0076 cm.

* * * * *